June 20, 1967 E. J. RYAN ET AL 3,326,747
DISINFECTING SOLUTION AND METHOD
Filed May 17, 1965
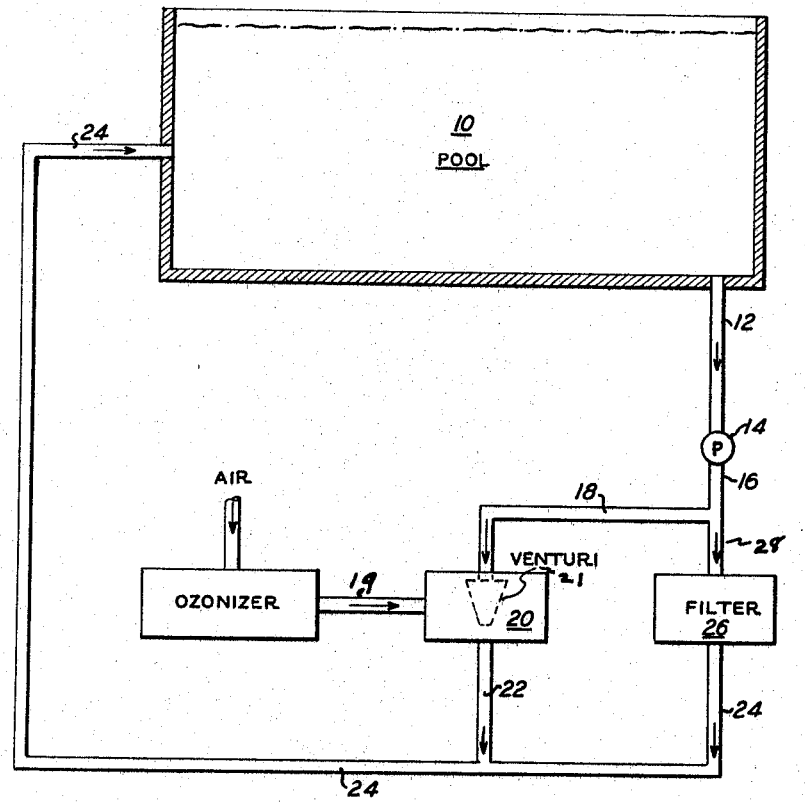
INVENTORS
EDMUND J. RYAN
MILES R. MOUNTIEN
BY Sol B. Wiese
ATTORNEY

United States Patent Office 3,326,747
Patented June 20, 1967

3,326,747
DISINFECTING SOLUTION AND METHOD
Edmund Joseph Ryan, Miami, and Miles R. Mountien, Miami Beach, Fla., assignors, by direct and mesne assignments, of five percent to Sol B. Wiczer, Washington, D.C., and ninety-five percent to Poly-Ox, Inc., a corporation of Florida
Filed May 17, 1965, Ser. No. 456,453
10 Claims. (Cl. 167—17)

This invention relates to disinfecting water, to production of disinfecting solutions usefully applied topically to disinfect surfaces contacted or washed therewith, and to disinfecting solutions which are non-toxic and may be applied topically in the disinfection of body surfaces and which can be injected parenterally in the medication of the living body.

In the water disinfecting aspect of my invention a very effective and economic chemical sterilization of mass volumes of water such as swimming pools and potable waters is effected by dissolving in the bulk water or a portion thereof a small quantity of a salt of iodine. The water containing the iodine salt is then circulated in a continuous or partially continuous stream through an oxidizing zone where the comparatively small stream of iodine salt solution in the water is oxidized, preferably by aspirating into the water a strong oxidizing agent such as ozonized air or ozonized oxygen.

The strong oxidation of the aqueous solution of the iodine salt converts iodide to free elemental iodine and to oxides thereof, such as iodites, hypoiodites, iodates or periodates, and mixtures thereof, dissolved in small quantity in the water which effects disinfection thereof to destroy bacterial contamination. The decontaminated stream is then recirculated back to the mass of water from which it is taken either with or without intermediate filtration. In this manner the bulk of the water of the pool is substantially continuously treated to destroy bacterial contamination by continuous oxidation of the iodide salt therein to free elemental iodine and strongly disinfecting oxidized products thereof, which in turn effectively destroy the bacteria.

The procedure hereof is highly economic and effective to reduce and maintain a low bacteria count in the water thus treated. Moreover, the large mass of water for bathing or drinking purposes containing the small quantity of iodine and oxides thereof is substantially non-irritating to the eyes or other sensitive membranes of the bathers using the mass of water for swimming and imparts less discernible obnoxious taste to the water as drinking water in comparison, for example, with chlorine, which most commonly has been used as a water disinfectant. Moreover, the present method is less dangerous and more simply applied and maintained by relatively unskilled personnel such as by home owners treating their own swimming pool to maintain it relatively bacteria-free, because it is necessary only to dissolve a small concentration of the iodide salt in the swimming pool or potable water supply to produce an effective concentration therein such as from about 0.5 to 15 parts per million, variable somewhat in this range with the demand; that is, with the bacterial contamination encountered.

It is necessary then merely to pump a small side stream taken from the bulk supply of water through an oxidizing zone where the water is treated with a strong oxidizing gas such as ozonized air or oxygen, which converts the iodide by oxidation to release some free elemental iodine proportional to the salt concentration, the iodine being further oxidized to oxides thereof as stated, which attack or destroy the ambient bacteria in the stream. That stream may be filtered or directly returned to the bulk mass as a pure feed of water thereto together with an additional content of unreacted iodine and iodates produced in the oxidation which continue the disinfecting cycle, reacting with ambient bacteria in the pool. Thus by this continuous circulation of a stream containing the iodine salt, and producing therein corresponding elemental iodine and its oxides, the pool itself is maintained at a desired low bacterial level.

For use of ozone as preferred herein, an electrical ozone generator which comprises an air blower or pump which passes the air slowly through a carbon arc or high voltage discharge or in contact with ultra violet light as is known in the art is used to produce an ozonized air having from 1 to 2% content of ozone therein. The source of air may be a tank of compressed air which as used will avoid other need for compressors or blowers. Alternately, the ozone may be formed from pure oxygen by subjecting the oxygen to a high voltage discharge of the order of about 15,000 volts and then exposing the gas to ultra violet light to produce a high concentration of ozone in pure oxygen, which in turn can be used as the oxidizing agent for treatment of the side stream of water. Such ozonization of pure oxygen is described in a prior patent of Ryan No. 3,063,904.

Alternatively, other known methods of producing a stream of ozone gas most economically as known in the art will form a useful supply of oxidizing gas for aeration of the iodide solution in the stream of water. The concentration and time of contact of the ozone with the side stream of water will be adjusted to effect sufficient oxidation of the iodide salt dissolved therein to release a quantity of elemental iodine and its oxides including iodites and iodates in the range indicated above.

Where the ozone gas has a high concentration of ozone, the same effect is available by use of smaller quantities. The ozone can be applied by merely bubbling air aspirating a small quantity of the gas through the flowing stream of iodide solution in water. Since the stream flows continuously and even small contact thereof with the ozonized gas introduces oxidizing agent in large excess most economically, the rate of contact is not critical.

The iodide salt dissolved in the water is a soluble iodine salt, preferably one which is highly soluble, such as an alkali metal salt of potassium, sodium or lithium, but other soluble iodides such as iodides of the alkali earth metals or other metals forming soluble iodides without limit other than possible toxicity may be used. For these reasons salts of silver, lead, mercury or arsenic would generally be avoided. It is preferred to use a salt bonding an excess of iodine; for instance, potassium triiodide is preferred because of the large amount of iodine which it bonds and because of the ease with which it is oxidized even by relatively weak ozone containing oxidizing gases, as well as its ready solubility in water.

A further advantage of iodine is in its non-irritation to living tissue, and the ease with which it is regenerated to active form by oxidation. An outstanding advantage of this invention is that the iodide salt in whatever reacted salt form it appears in the water becomes regenerated to active form in the presence of the strong oxidizing reaction applied to the side stream of water. Thus during the treatment of water such as swimming pool water, having dissolved a modest amount up to about 15 parts per million of potassium triiodide, the iodine becomes converted in the side stream to elemental iodine and oxides thereof, which in turn reacts with bacteria destroying them, and the iodide becomes again regenerated by oxidation in continuous circulation through the oxidizing zone as active iodine or oxide thereof, and in this manner the treatment of the mass bulk of water in quantities as stated maintains a low bacteria count in the water for very long periods of time.

Particularly an effective purification action becomes available not merely by destroying the bacteria but by operation and use of the bulk volume of water such as a swimming pool in conjunction with a filter by which suspended particles of impurity are also continuously removed.

The treatment of bulk masses of water by dissolving therein iodide salts and treating with an ozonized gas is an important economy. The pH of the water does not substantially change by the process described. This is in contrast to the treatment of water with such oxidizing gases as chlorine or oxidizing salts which release chlorine and/or oxygen such as hypochlorites, chlorites and perchlorites as has been suggested in the art.

Nevertheless, where oxidizing equipment of the type described is not readily available, or where the reduced pH of the water is not unduly detrimental to the use to which the water is to be applied and is therefore also non-critical, such chlorine-containing oxidizing salts preferably dissolved in aqueous solution can be applied to the water to be treated; that is, water containing the pre-dissolved iodide salt as the oxidizing agent therefor.

Moreover, while it is preferred to continuously remove a small side stream from the main body of flowing water being treated for purposes of imparting strong oxidation to the water containing iodide salt in a limited area, the treatment can also be applied with lesser advantage by passing the ozonized gas or adding the oxidizing agent in a small or limited area of the bulk of the water, such as at a corner of the swimming pool through which the water may be circulated to a greater or less degree in use. Such method will operate to reduce the bacterial count in the water with a much lower efficiency, however, than the preferred procedure as described.

*Example 1*

The invention is further described in conjunction with the drawing in which the single figure diagrammatically shows a swimming pool 10 having an outlet duct near the bottom 12 supplying fluid to the suction inlet of a pump 14. The pump 14 has an outlet line 16 which is divided, a leg 18 thereof taking some of the water and passing the same through a venturi nozzle 21 in venturi chamber 20, which acts as a suction nozzle by its venturi effect, to induce an intake of ozonized gas entering from duct 19 which admixes with the water passing through the venturi chamber 20. The ozone in the air oxidizes the dissolved iodide salt therein and passes the solution and entrained gas through a duct 22. The free elemental iodine or iodates evolved by the oxidation and the residual iodine salt remain dissolved in the stream, which rejoins a main circulating stream in duct 24 and is returned to the pool. The second leg or side stream of the divided duct 16 enters a filter 26 through the branch duct 28. The filtered main stream of water passes then through duct 24, which mixes with the elemental iodine and iodates dissolved in the water from line 22 as it returns to the pool. The pool merely has added thereto a concentrated solution in water of potassium tri-iodide in quantity to maintain therein from about 1 to 15 p.p.m. of iodide salt.

*Example 2*

A swimming pool has added thereto sufficient potassium tri-iodide to provide 12 parts per million of the dissolved salt. Since the salt dissolves quite easily, it is necessary only to usefully dissolve several pounds of salt in several gallons of the water, which is then poured into the pool. A side stream of the swimming pool water is removed at a rate of about 50 gallons per minute containing as stated 12 parts per million of the potassium tri-iodide. The stream is divided so that 10 gallons per minute are passed through a shunt line 18 and the balance of 40 gallons per minute is passed through a filter by way of line 28. In the shunt line 18, is a venturi nozzle 21 which aspirates about 2 cc. per minute of air containing 1½% of ozone formed therein by a small high voltage, such as 15,000 volts, discharge ozonizer of standard construction. The purified side stream rejoins the main stream comprising the effluent water from the filter 26 and both are recycled to the swimming pool by way of a duct 24. The bacteria count of the swimming pool used by many daily bathers over a month's time was found to have an average bacteria population of less than 10 per cc. Moreover, it was found on hourly analysis of the water returning to the pool by sodium thiosulfate titration that free iodine was present in average quantity of about 3 parts per million.

In another aspect of this invention, aeration of an aqueous solution of an iodide salt in suitable concentration with ozonized gas, preferably ozonized pure oxygen, converts the aqueous solution to a useful disinfecting liquid for general application as a disinfectant. In moderate concentrations, such as from 10 to 2,000 p.p.m., measured as initially dissolved iodide salt in water, the solution may be aplpied medically; that is, topically for disinfection of surface wounds, burns, or the like in living bodies. In somewhat weaker concentration, such as from about 10 to 1500 p.p.m. salt in water, the solution may be injected parentally as an injectible such as intramuscularly. For production of a general purpose surface disinfecting liquid the upper limit of ozonized iodide salt in water may be considerably higher, such as up to 100,000 p.p.m. In such higher concentrations the treated disinfectant solution may be used as a disinfecting rinse for contaminated surfaces such as dishes, floors, food machinery and the like.

In forming the aqueous ozonized iodide salt solution, the salt is first dissolved in water in the desired concentration, as stated, and gaseous ozone produced by an ozonizer is bubbled through the aqueous iodide salt solution for a period ranging from several minutes up to an hour. The reaction is usually completed in about 15 to 20 minutes of bubbling of the ozonized gas through the iodide salt solution so that the upper time limit more or less is not critical; that is, the gas may be passed through the solution for substantially longer periods. After introduction of the ozone is begun, the aqueous solution of the iodide salt becomes darkened slightly, indicating the probable release of free iodine, but after a short time the aqueous solution becomes clear, water-weight. The termination of ozone treatment of the aqueous solution may follow the color of the solution as a rough guide for measuring the extent of ozone treatment needed to convert the iodide salt to useful oxidized disinfecting form.

The ozonized gas can be ozonized air, but whether air or oxygen gas is used, the gas will either be protected from sputtered particles released by discharge from an electric arc to which the gas is usually subjected in the formation of the ozone, or it is filtered to remove such particles before bubbling through the aqueous iodide solution. It is preferred to use pure oxygen as the source of gas which is ozonized, protecting the same against inclusion of impurties in a manner such as described in my prior Patent No. 2,937,983. Where the aqueous solution is to be used for medicating a living body, it is further preferred to include up to about 2% of ordinary sodium chloride so that the aqueous solution will be less irritating. The sodium chloride is preferably added after the ozonization of the liquid has been effected, although for some purposes it may be added beforehand, particularly where the aqueous solution is applied topically or is to be used as a general disinfectant.

The following example illustrates the practice of this phase of the invention.

*Example 3*

A solution of 400 p.p.m. of potassium tri-iodide in water was treated by slowly bubbling ozonized pure oxygen gas containing about ¾% of ozone in oxygen. The ozonized gas was first filtered through glass wool and then slowly bubbled through the aqueous solution of the iodide salt. Almost immediately an amber color developed in the solution indicating the release of free iodine, which in continuous bubbling for about 8 minutes began to clarify. The bubbling was continued for a total of 20 minutes. The solution was then applied in the disinfection of a surface wound and was found to usefully disinfect and promote the healing of the open wound. Such solution was also found to be usefully injected intramuscularly at the site of an infection and promoted the healing in small ½ cc. injections applied twice a day.

Various modifications will occur to those skilled in the art and, accordingly, it is intended that the description be illustrative and not limiting except as defined in the claims appended hereto.

We claim:

1. The method of forming an aqueous disinfecting solution, comprising dissolving from 10 to 100,000 p.p.m. of a soluble iodide salt in an aqueous solvent and then oxidizing said solution with an ozone-containing gas in sufficient quantity to convert at least a portion of said iodide salt to an oxide of said iodide and to form a clear, colorless solution.

2. The method of claim 1 wherein the iodide salt is potassium tri-iodide.

3. The method of claim 1 wherein the solution is useful as a living body disinfectant liquid, the iodide salt is present in from 10 to 2,000 p.p.m., and it is ozonized for a period of time to first generate color and then be oxidized to a colorless solution.

4. The method of claim 1 wherein the aqueous solution has 10 to 1500 p.p.m. of iodide salt dissolved therein and is oxidized by aerating with an ozonized substantially pure oxygen gas for a period of time to first generate color and then be oxidized to a colorless solution.

5. A disinfecting solution, comprising an aqueous iodide solution containing from 10 to 100,000 p.p.m. of soluble iodide salt, and oxidized by aerating with an ozone-containing gas in quantity sufficient to first release color and then become colorless oxides of said iodide salt.

6. An aqueous medically disinfecting solution comprising an aqueous solution of 10 to 2,000 p.p.m. of soluble iodide salt oxidized by aerating said solution with a purified ozone-containing gas by passing the gas through said solution until color is first developed and then becomes colorless oxides of said iodide salt.

7. The solution of claim 6 further containing about 2% of sodium chloride.

8. The solution of claim 6 wherein the dissolved iodide salt is potassium tri-iodide present in quantity of from 10 to 1500 p.p.m. and the ozone-containing aerating gas is ozonized substantially pure oxygen.

9. The method of disinfecting a large pool of water such as a swimming pool, comprising dissolving independently of said large pool at least 10 p.p.m. of a soluable iodide in a relatively small quantity of water, aerating said water with an ozone-containing gas until it has oxidized the iodine content to a higher oxide thereof, and then mixing the relatively small body of water with said large body of water to disinfect the same.

10. The method of claim 9 wherein the iodide is potassium triiodide.

References Cited

UNITED STATES PATENTS 2,580,809    1/1952    Marks et al. _____ 210—62

OTHER REFERENCES

The Merck Index, Merck and Co., Inc. Rahway, N.J. (1960), pp. 847, 948–949.

ALBERT T. MEYERS, *Primary Examiner.*

STANLEY J. FRIEDMAN, *Assistant Examiner.*